US012391537B2

(12) United States Patent
Wantland et al.

(10) Patent No.: US 12,391,537 B2
(45) Date of Patent: Aug. 19, 2025

(54) AUTOFILL PITCHER ASSEMBLY WITH HIDDEN VENTING

(71) Applicant: Haier US Appliance Solutions, Inc., Wilmington, DE (US)

(72) Inventors: Louis A. Wantland, Louisville, KY (US); Bradley Nicholas Gilkey, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 226 days.

(21) Appl. No.: 18/181,998

(22) Filed: Mar. 10, 2023

(65) Prior Publication Data

US 2024/0300802 A1 Sep. 12, 2024

(51) Int. Cl.
*B67D 3/00* (2006.01)
*F25D 23/12* (2006.01)

(52) U.S. Cl.
CPC ......... *B67D 3/0061* (2013.01); *B67D 3/0038* (2013.01); *B67D 3/0087* (2013.01); *F25D 23/126* (2013.01); *F25D 2331/81* (2013.01)

(58) Field of Classification Search
CPC .. B67D 3/0061; B67D 3/0038; B67D 3/0087; F25D 23/126; F25D 2331/81; F25D 23/028
See application file for complete search history.

(56) References Cited

U.S. PATENT DOCUMENTS 3,760,977 A * 9/1973 MacKinnon ........... B65D 90/34 220/303
3,927,798 A * 12/1975 Loomis .............. B65D 51/1622 220/373
4,623,076 A * 11/1986 Karpal ............... B65D 51/1688 222/545
5,071,020 A * 12/1991 Reutter ................ F01P 11/0214 220/301
5,560,393 A 10/1996 Clack
6,574,984 B1 6/2003 McCrea et al.
6,732,878 B2 * 5/2004 Gillen .................... B65D 90/34 220/582
7,484,636 B2 * 2/2009 Yoshida ............. B60K 15/0406 220/303
9,557,097 B2 1/2017 McMahan et al.
10,118,113 B2 11/2018 Shotey et al.
10,889,484 B2 1/2021 Subramanya et al.
10,955,187 B2 3/2021 Scalf
2015/0197417 A1 7/2015 Stagg et al.
2024/0300802 A1 * 9/2024 Wantland ............. B67D 3/0087

FOREIGN PATENT DOCUMENTS

CN 1367751 A * 9/2002 ......... B65D 41/0471

OTHER PUBLICATIONS

Home Water Pitcher Jug 3.5 L Capacity 7 Stages Activated Carbon Green.

* cited by examiner

*Primary Examiner* — Bob Zadeh
(74) *Attorney, Agent, or Firm* — Dority & Manning, P.A.

(57) ABSTRACT

An autofill pitcher assembly having hidden venting is provided. The assembly includes a pitcher wall defining an opening at a top edge of the pitcher and a lid removably received in the opening. The lid includes a top wall, a skirt extending from a bottom surface of the top wall, a gasket disposed on the skirt, and a vent formed in the skirt between the gasket and the bottom surface of the top wall.

14 Claims, 10 Drawing Sheets

AUTOFILL PITCHER ASSEMBLY WITH HIDDEN VENTING

FIELD OF THE INVENTION

The present subject matter relates generally to pitchers, and more particularly to water pitchers used with refrigerator appliances.

BACKGROUND OF THE INVENTION

Liquid pitchers, commonly water pitchers, are often provided to store and serve beverages. It is becoming common for pitchers to be associated with refrigerator appliances as a convenience to provide access to chilled water. Some refrigerator appliances provide a retaining cavity on a door to receive and retain a pitcher, with some retaining cavities including an autofill feature to maintain a prescribed level of water in the pitcher. In such cases, the contents of the pitcher are subject to frequent movement as the refrigerator appliance door is open and closed. Accordingly, door-mounted pitchers may beneficially be fitted with lids that provide a seal to prevent pitcher contents from splashing out of the pitcher volume as the door is open and closed, while still allowing the pitcher to be used for pouring out the contents of the pitcher volume. A spout may be provided to facilitate dispensing, or pouring, from the pitcher.

In order to pour pitcher contents with a uniform flow, the pitcher must continuously draw in a volume of air to offset the volume of water dispensed. Known lids are directly vented to the ambient atmosphere to permit the introduction of air to the pitcher volume. However, direct venting may allow contents of the pitcher to leave the pitcher when the contents of the pitcher are splashing, for example during opening and closing of the door. This can lead to unwanted spills and user dissatisfaction. Accordingly, a pitcher having an air intake that addresses one or more of the challenges noted above would be desirable.

BRIEF DESCRIPTION OF THE INVENTION

The present subject matter provides a pitcher and lid that allows the introduction of ambient air to the pitcher volume when liquid is being poured from the pitcher without allowing contents of the pitcher to splash out of the pitcher volume. Aspects and advantages of the invention will be set forth in part in the following description, may be apparent from the description, or may be learned through practice of the invention.

In one exemplary aspect, an autofill pitcher assembly with hidden venting is provided. The autofill pitcher assembly comprises a pitcher having a pitcher wall connected to a pitcher bottom, the pitcher wall defining an opening at a top edge of the pitcher and a lid removably received in the opening of the pitcher. The lid comprises a top wall having a bottom surface with a skirt extending from the bottom surface, a gasket disposed on the skirt spaced from the bottom surface, and a vent defined in the skirt at a location between the bottom surface of the top wall and the gasket.

In another example aspect, a lid for a pitcher is provided, the lid comprising a top wall having a bottom surface, a skirt extending from the bottom surface, and a gasket disposed on the skirt spaced from the bottom surface. The skirt defines a vent formed therethrough, the vent located between the bottom surface and the gasket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
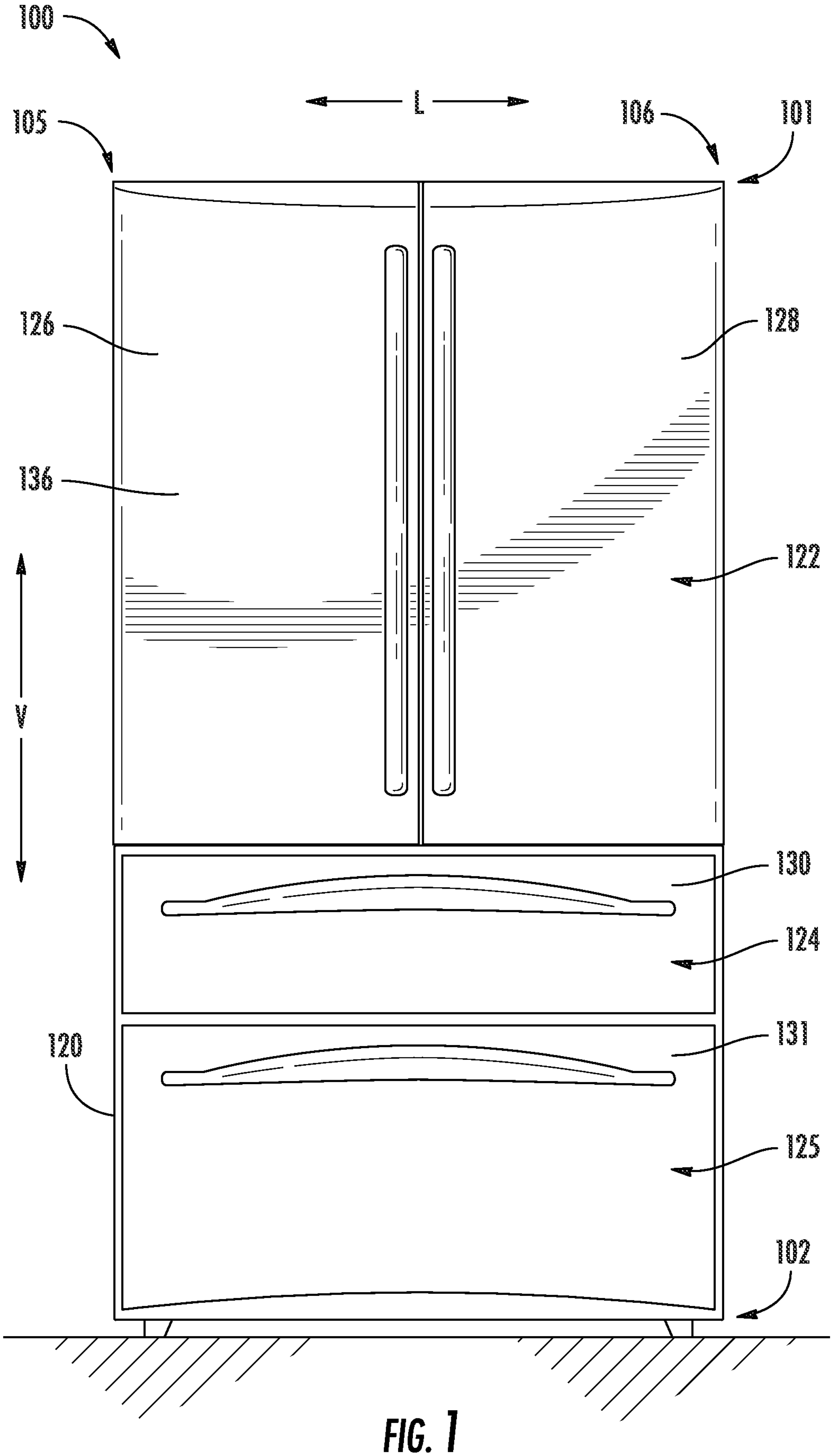
FIG. 1 provides a front view of a refrigerator appliance with which an autofill pitcher assembly according to an exemplary embodiment of the present disclosure may be used.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

As used herein, "above" and "below" generally mean at a higher or lower vertical place or location than the referenced location or element. With reference to this disclosure, "above" and "below" are used to distinguish position in the vertical V direction or the height H direction.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Turning to the figures, FIG. 1 provides a front view of an exemplary refrigerator appliance 100 according to an exemplary embodiment of the present disclosure. Refrigerator appliance 100 extends between a top 101 and a bottom 102 along a vertical direction V, between a left side 105 and a right side 106 along a lateral direction L, and extends between a front and a back along a transverse direction T (not shown), which is a direction orthogonal to the vertical direction V and the lateral direction L. Vertical direction V, lateral direction L, and transverse direction T are mutually perpendicular and form an orthogonal direction system.

Refrigerator appliance 100 includes a housing or cabinet 120 defining a chilled chamber, fresh food chamber 122, and one or more freezer chambers, such as a first freezer chamber 124 and a second freezer chamber 125, which may both be arranged below fresh food chamber 122 along the vertical direction V. As illustrated, fresh food chamber 122 is bounded by vertical walls at the left side 105 and at the right side 106, such walls spaced apart in the lateral direction, a horizontal wall at the top 101 and at the bottom by a lower wall 132. In this configuration, refrigerator appliance 100 may generally be referred to as a bottom mount, or bottom freezer, refrigerator. Cabinet 120 also defines a mechanical compartment (not shown) for receipt of a sealed cooling system (not shown).

Left and right refrigerator doors 126, 128, respectively, are rotatably hinged to an edge of cabinet 120 at left 105 and right 106 sides, respectively, for accessing fresh food chamber 122 (FIG. 2) or sealing fresh food chamber 122 as illustrated in FIG. 1. For example, upper and lower hinges may couple each door 126, 128 to cabinet 120. When left and right doors 126, 128 are configured as illustrated in FIG. 1, the door arrangement is sometimes referred to as a "French door" configuration. Freezer doors, such as a first freezer door 130 and a second freezer door 131, may be arranged below refrigerator doors 126, 128 for accessing one or more freezer chambers, such as first and second freezer chambers 124, 125, respectively. In the exemplary embodiment shown in FIG. 1, freezer doors 130, 131 are coupled to freezer drawers (not shown) slidably coupled within first and second freezer chambers 124, 125. Such drawers are thus generally "pull-out" drawers in that they can be manually moved into and out of freezer chambers 124, 125 on suitable slide mechanisms. Each door 126, 128, 130, 131 can include a handle for accessing one of the chambers 122, 124, 125 of refrigerator appliance 100.

Figure 2:
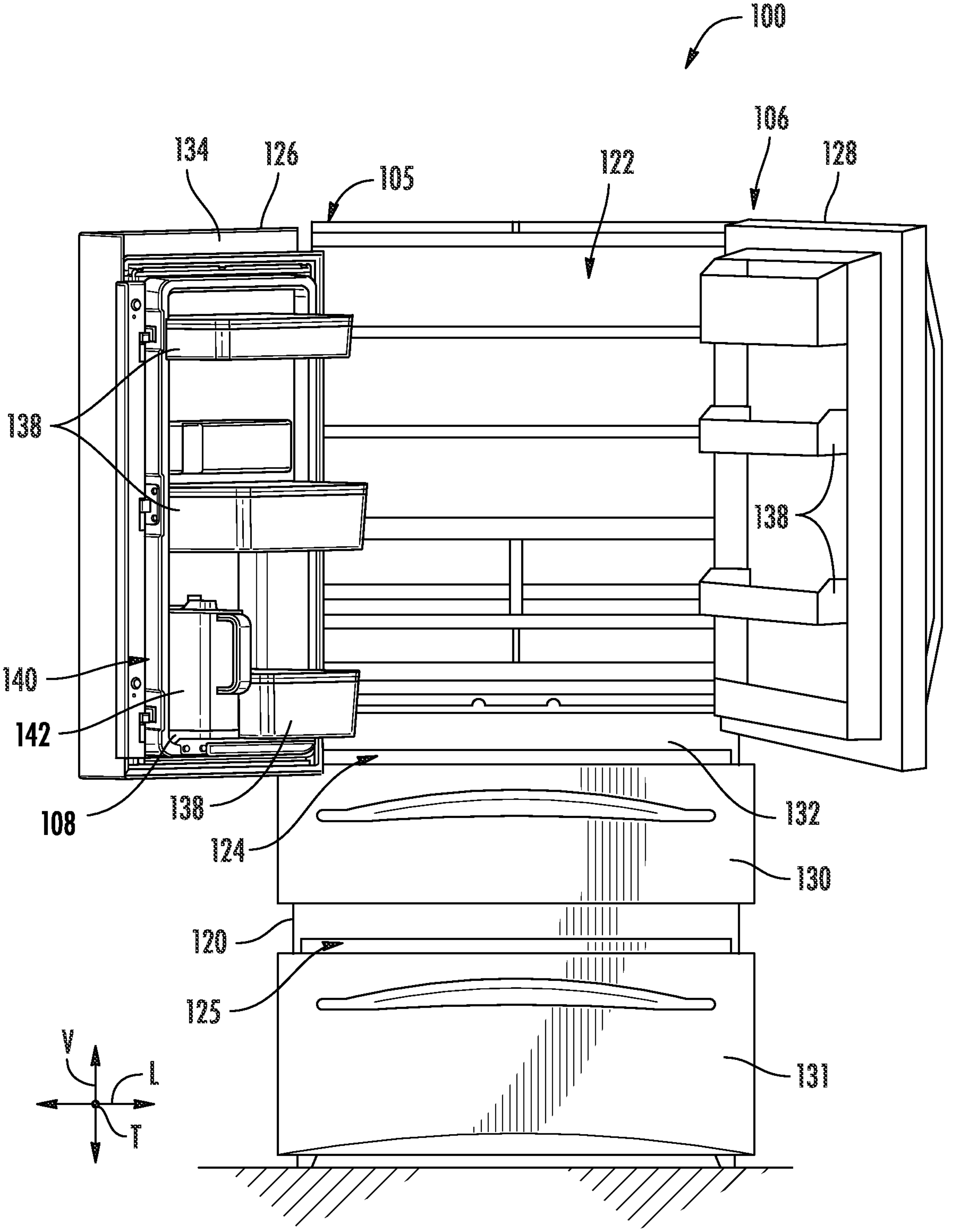
FIG. 2 provides a front view of the refrigerator appliance of FIG. 1 with refrigerator doors shown in an open configuration.

FIG. 2 provides a front perspective view of refrigerator appliance 100 showing refrigerator doors 126, 128 in an open position to reveal the interior of fresh food chamber 122. Additionally, freezer doors 130, 131 are shown in partially open positions to reveal a portion of the interior of freezer chambers 124, 125, respectively.

Left door 126 of refrigerator appliance 100 includes an inner surface 134 and an outer surface 136. Inner surface 134 generally defines a portion of the interior of fresh food chamber 122 when door 126 is in a closed position as shown in FIG. 1. Outer surface 136 is generally opposite inner surface 134 and defines a portion of the exterior of refrigerator appliance 100 when door 126 is in the closed position.

The same construction may result in a similarly formed right door 128 as left door 126 with inner surface 134 and outer surface 136. Moreover, it will further be appreciated that freezer doors 130, 131 can likewise include inner and outer surfaces.

Doors 126, 128 may include storage bins or shelves 138 movably or fixedly attached to the inner surface 134 of the doors 126, 128. In the embodiment illustrated in FIG. 2, left door 126 includes pitcher system 140, which may include pitcher 142 and lid 154 (collectively pitcher assembly 143), a support or shelf 108 to support and secure the pitcher assembly 143 on the door 126, and autofill pitcher components to dispense water into the pitcher to a predetermined level. Autofill pitcher components may include a water supply conduit, valves, switches and sensors (not shown) to provide features normally associated with an autofill pitcher system. Generally, pitcher system 140 receives and retains pitcher assembly 143 for access when the left door 126 is open as in FIG. 2. The pitcher system 140 is illustrated on the left door 126 for convenience. In other embodiments, the pitcher system 140 may be in a different position on the left door 126, or on the right door 128, or elsewhere within the fresh food chamber 122.

Figure 3:
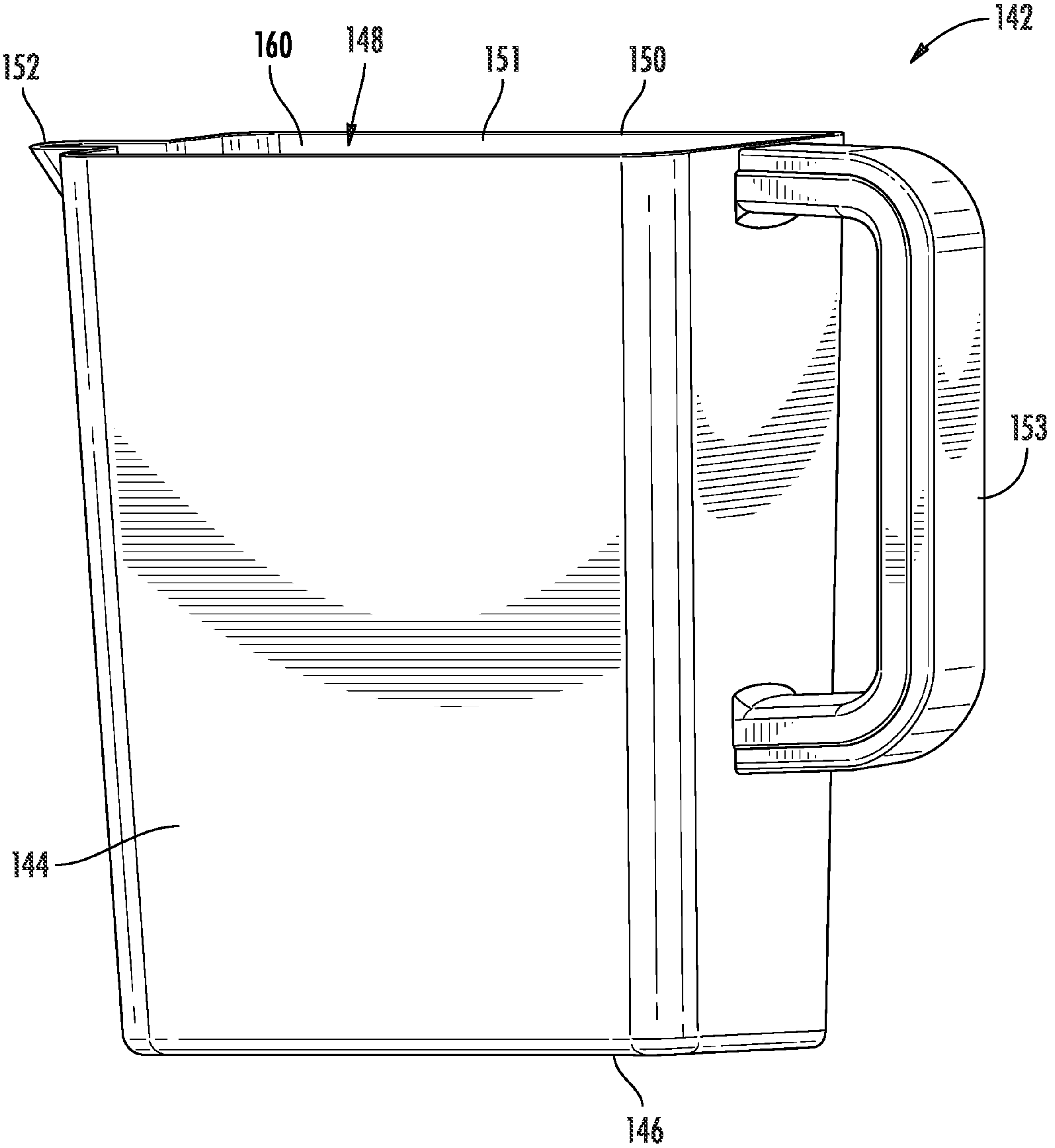
FIG. 3 provides a perspective view of a pitcher in accordance with an embodiment of the present disclosure.

FIG. 3 is a perspective view of a representative pitcher 142 comprising a pitcher wall 144 connected to, or formed with, pitcher bottom 146. A top edge 150 is formed by the pitcher wall 144 at the pitcher end opposite pitcher bottom 146. The pitcher wall 144 and pitcher bottom define a pitcher volume 148, accessible through opening 151 defined by the top edge 150. For convenience, top edge 150 of pitcher wall

144 may also define a spout 152 at a first end of the pitcher to facilitate directing a liquid flow out of the pitcher 142 or pitcher assembly 143. The pitcher wall deflects away from the pitcher volume at the spout 152 to at least partially form the spout 152. At a second end of the pitcher, opposite the spout 152, a handle 153 may be included to provide a gripping area to aid in manipulating the pitcher 142.

Exemplary pitcher 142 is illustrated as a generally hollow rectangular cuboid for ease of illustration only. Other embodiments may have other shapes, for example a hollow cylinder, and may or may not have features such as a spout or a handle. Embodiments disclosed herein are directed to an autofill pitcher adapted for use in a refrigerator, specifically pitchers adapted to mount to a refrigerator appliance door. However, the disclosed features may be used with other types of pitchers. For example, some features may be beneficial to incorporate into a manual fill pitcher.

Figure 4:
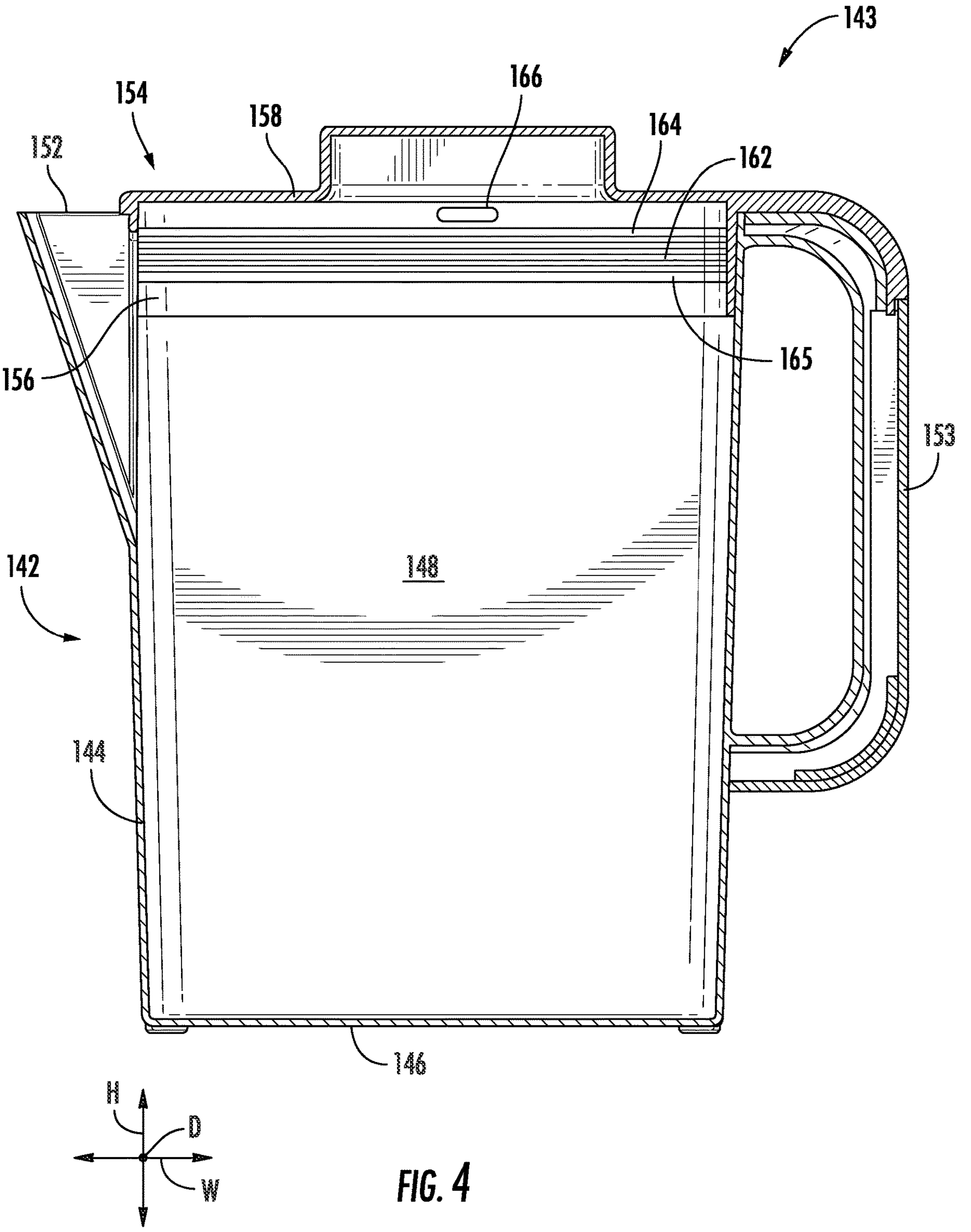
FIG. 4 provides a side sectional view of a pitcher and lid in accordance with an embodiment of the present disclosure.
Figure 5:
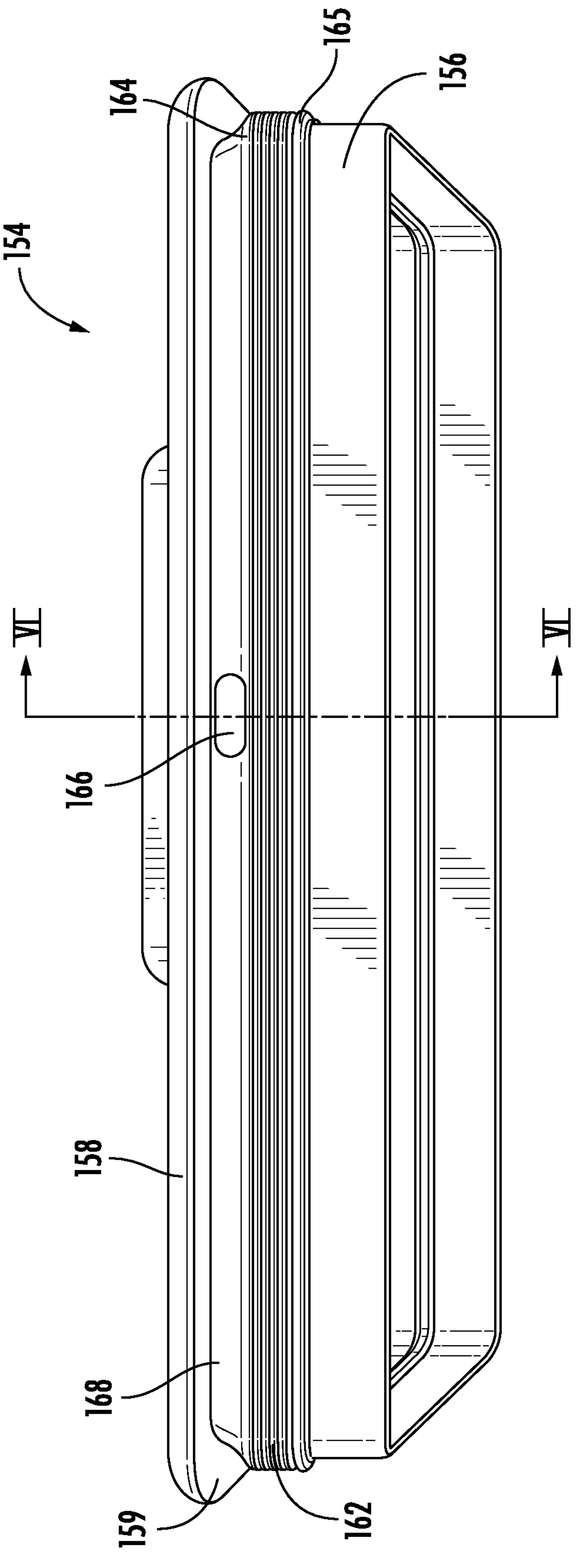
FIG. 5 provides a perspective view of a pitcher lid in accordance with an embodiment of the present disclosure.

FIG. 4 provides a side sectional view of exemplary pitcher assembly 143 comprising pitcher 142 with a lid 154. An orthogonal coordinate system for the embodiment of water pitcher assembly 143 is defined in FIG. 4. The height H direction is generally parallel to the vertical direction V used in reference to the refrigerator appliance 100 in FIGS. 1 and 2. Width direction W extends perpendicular to the height H from the spout (first) end to the handle (second) end of the pitcher 142. The depth D direction is perpendicular to the H-W plane.

The pitcher assembly 143 illustrated in FIG. 4 includes a lid 154 removably received in the opening 151 at the top edge 150. The lid 154 may include a top wall 158 joined to, or formed with, a substantially continuous peripheral skirt 156. The skirt 156 extends from bottom surface 159 of the top wall 158, the skirt being spaced from the perimeter 161 of the lid 154. The skirt 156 is configured to be removably received in the opening 151 of pitcher 142. The top wall 158 extends beyond the skirt 156 in the D-W plane. The extension of top wall 158 may facilitate an abutting relationship between the bottom surface 159 of lid 154 with top edge 150 of the pitcher 142 when the lid 154 is removably received in the pitcher 142. The abutting relationship may sealingly engage the bottom surface 159 with top edge 150.

As illustrated, a sealing element or gasket 162 is disposed around the perimeter of the skirt 156 to provide a sealing engagement with the skirt 156 and the inner surface 160 (FIG. 3) of the pitcher wall 144. The gasket 162 may be formed from any material suitable to seal, or substantially seal, against infiltration of liquid, for example a polymeric material. Gasket 162 is positioned on, and extends outwardly from, the skirt 156. Gasket 162 may be vertically constrained between upper and lower retaining walls 164, 165 positioned, respectively, above and below the gasket 162 in the H direction. The lower retaining wall 165 is vertically (in the H direction) positioned below the vent 166 (described below) and the upper retaining wall 164 is positioned between the lower retaining wall 165 and the vent 166. In embodiments, the gasket 162 may be a separate element disposed on the skirt 156 and may be anchored to the skirt 156 using known adhesive or mechanical methods.

As illustrated, gasket 162 includes multiple sealing surfaces 163 on an outwardly directed face, positioned and configured to engage with the inner surface 160 of pitcher wall 144. The sealing surfaces 163 may be multiple, generally horizontally oriented (i.e., in the D-W plane) thin blades as illustrated. In other embodiments, the sealing surfaces 163 may be different in number or configuration. The multiple sealing surfaces 163 may facilitate a watertight, or substantially watertight, seal between the lid 154 and the inside surface 160 of pitcher wall 144. As illustrated in the embodiment of FIG. 6, the multiple sealing surfaces 163 engage with the inner surface 160 of pitcher wall 144 when the lid 154 is fully received in the opening 151 of the pitcher 142.

Gasket 162 is illustrated in the exemplary embodiments as a continuous band extending around the perimeter of skirt 156. In other embodiments, the gasket 162 may not be continuous (e.g., gasket 186, FIG. 9). For example, in an embodiment, the gasket 156 may be interrupted at the spout 152. That is, a portion of the gasket 162 that corresponds with the spout 152 area of the pitcher 142 may be removed and the gasket 162 configured as a linear length of gasket material having two ends rather than a continuous band. In some embodiments, each end may be anchored on either side of the spout 152. Anchoring can be achieved by known methods using heat, adhesive, vibration, or mechanical fasteners to fix the ends to the skirt 156.

Figure 6:
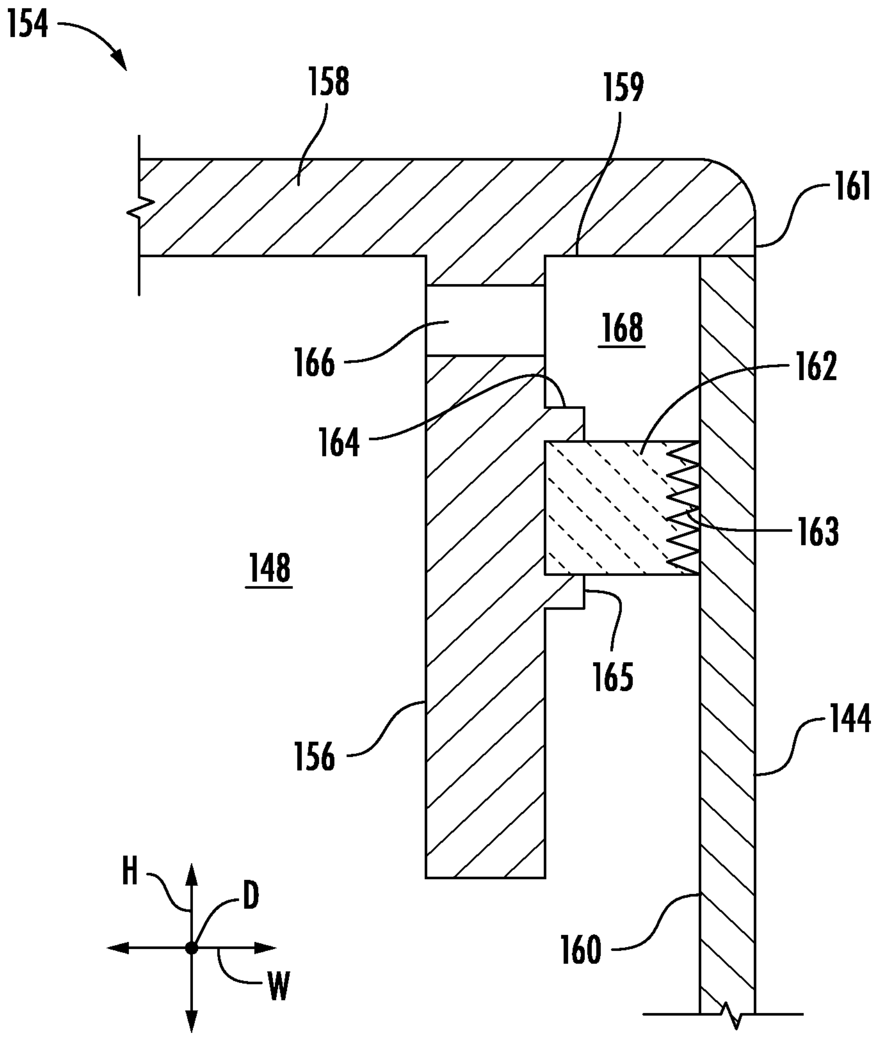
FIG. 6 provides a sectional view of portion of the pitcher lid of FIG. 5 taken along line VI-VI.

As may be best understood from FIG. 6, the skirt 156, bottom surface 159 of top wall 158, and gasket 162 form three sides of (i.e., partially define) air flow channel 168. The skirt 156, bottom surface 159, and gasket 162 cooperate with pitcher wall 144 to form an air flow channel 168 when the lid 154 is fully received within the pitcher 142. The pitcher wall 144 and the skirt 156 are spaced apart in the width W direction providing the widthwise boundary for the air flow path. The gasket 163 spans the space between the skirt 156 and the pitcher wall 144 providing a lower (in the H direction) boundary and the bottom surface 159 of top wall 158 provides the top boundary.

Figure 7:
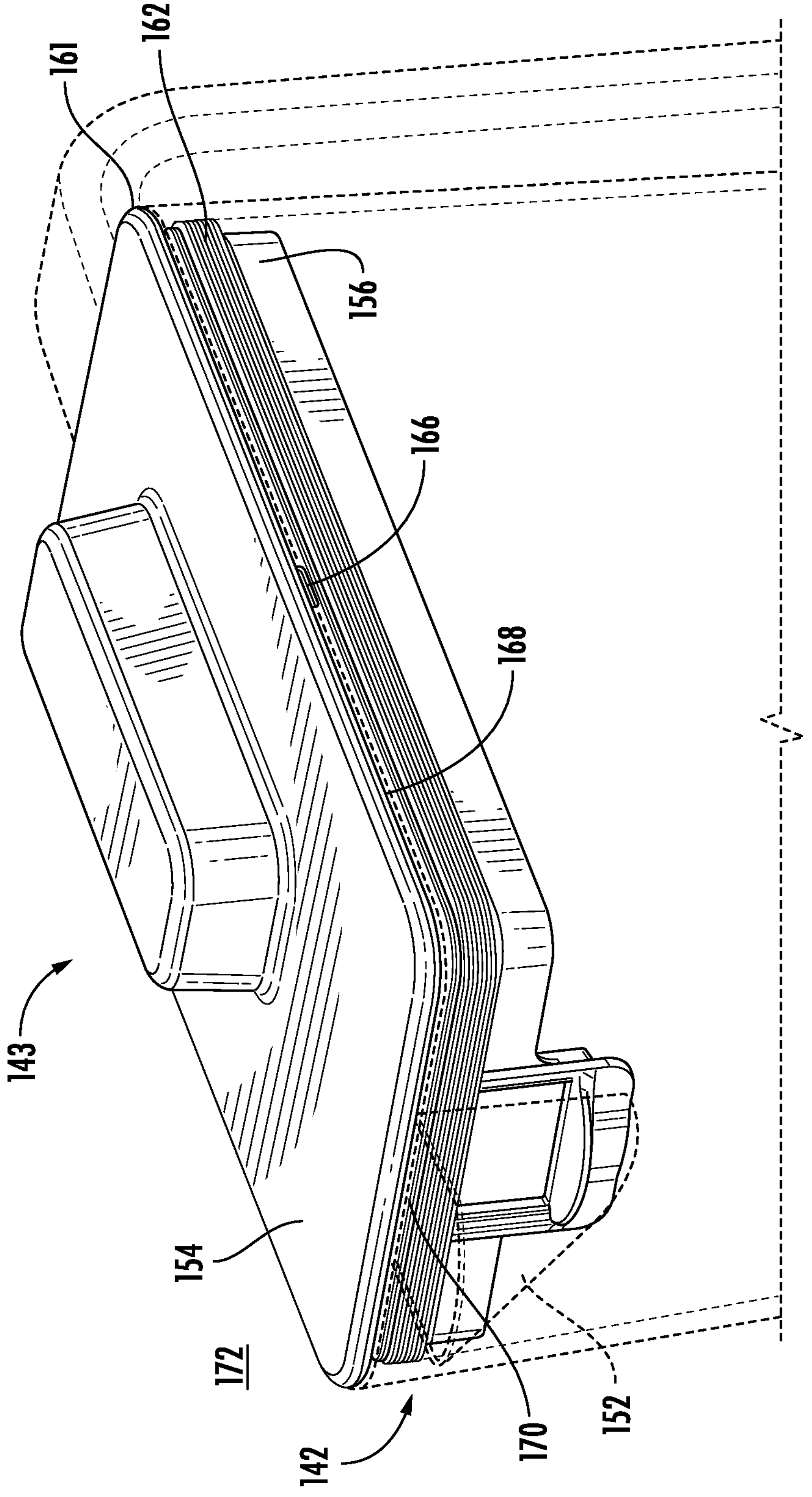
FIG. 7 provides a partial perspective view of a pitcher and lid in accordance with an embodiment of the present disclosure.

The air flow channel 168 is bounded on four sides around the perimeter of the pitcher 142 with the exception of at the spout 152. As can be seen in at least FIG. 7, at the spout 152, the pitcher wall 144 deflects away from the skirt 156 such that the air flow channel 168 is open to ambient air. Air inlet 170 is thus formed, placing the air flow path in fluid communication with the ambient atmosphere 172.

As illustrated, fluid communication is provided between the air flow channel 168 and the pitcher volume 148 via vent 166 formed through the skirt 156. The vents 166 therefore puts the pitcher volume 148 in fluid communication with the ambient atmosphere 172. One or more vents 166 may be formed through the skirt 156, the vents 166 located vertically (i.e., in the H direction) above the gasket 162 (and above upper retaining wall 164 if provided) and below the top wall 158 of the lid 154. In the exemplary embodiments illustrated in the figures, one oval-shaped vent 166 is shown for ease of illustration. In other embodiments, other shapes are used for the vents 166 and more than one vent 166 may be formed through the skirt 156 as described above.

Figure 8:
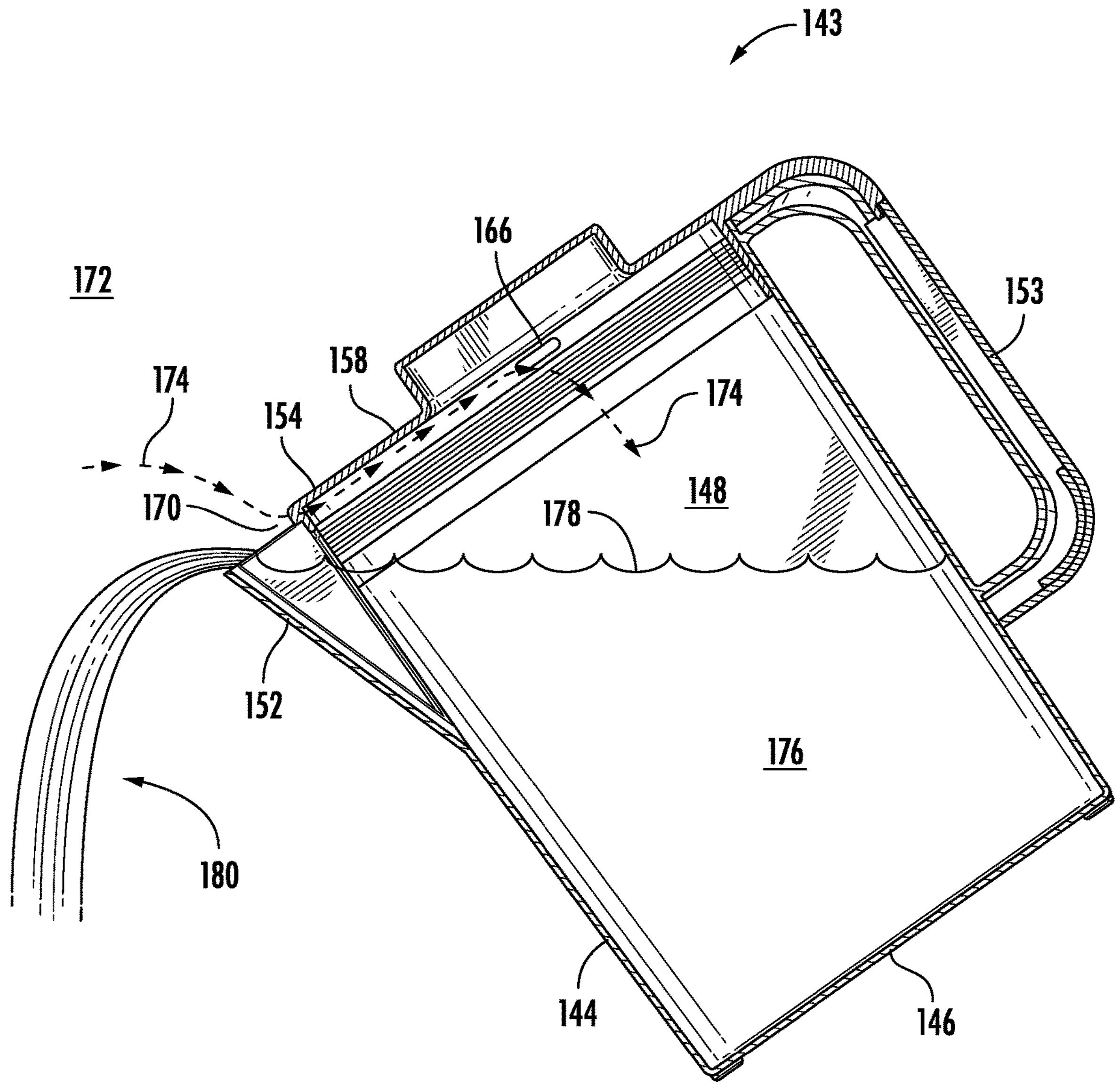
FIG. 8 provides a side view of a pitcher assembly dispensing liquid in accordance with an embodiment of the present disclosure.

FIG. 8 is illustrative of a pitcher assembly 143 in accordance with an embodiment of the present disclosure dispensing a fluid 176 by tilting or rotating the pitcher 142 in the counterclockwise direction. As the pitcher assembly 143 rotates, the fluid level 178 reaches the spout 152 and a fluid stream 180 exits the pitcher assembly 143. With the outward flow of liquid 176, ambient air 172 is drawn into the pitcher volume 148 as ambient air flow 174. The ambient air flow 174 is drawn into air inlet 170, through air flow channel 168, entering the pitcher volume 148 through one or more vents 166.

Figure 9:
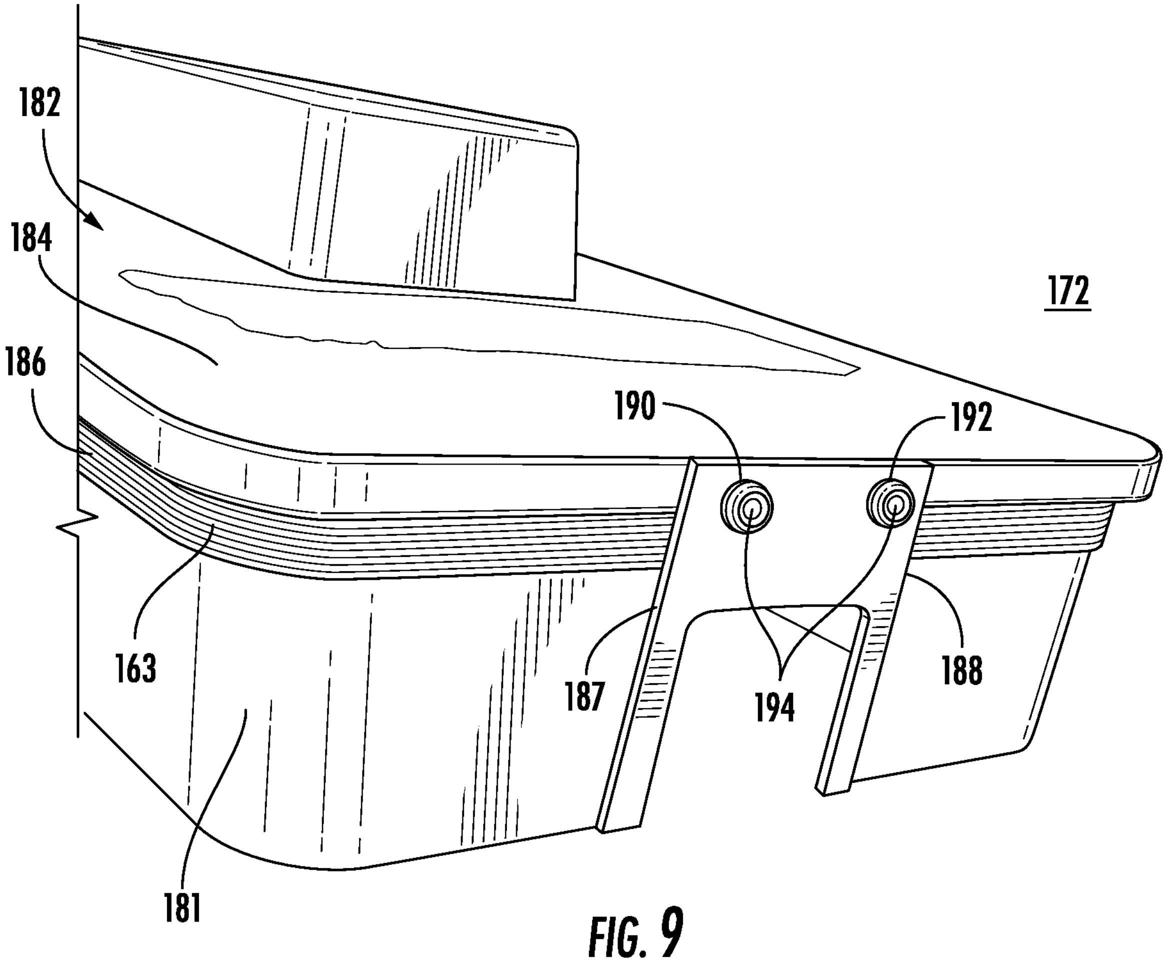
FIG. 9 represents a partial perspective view of an alternate embodiment of a pitcher lid in accordance with the present disclosure.
Figure 10:
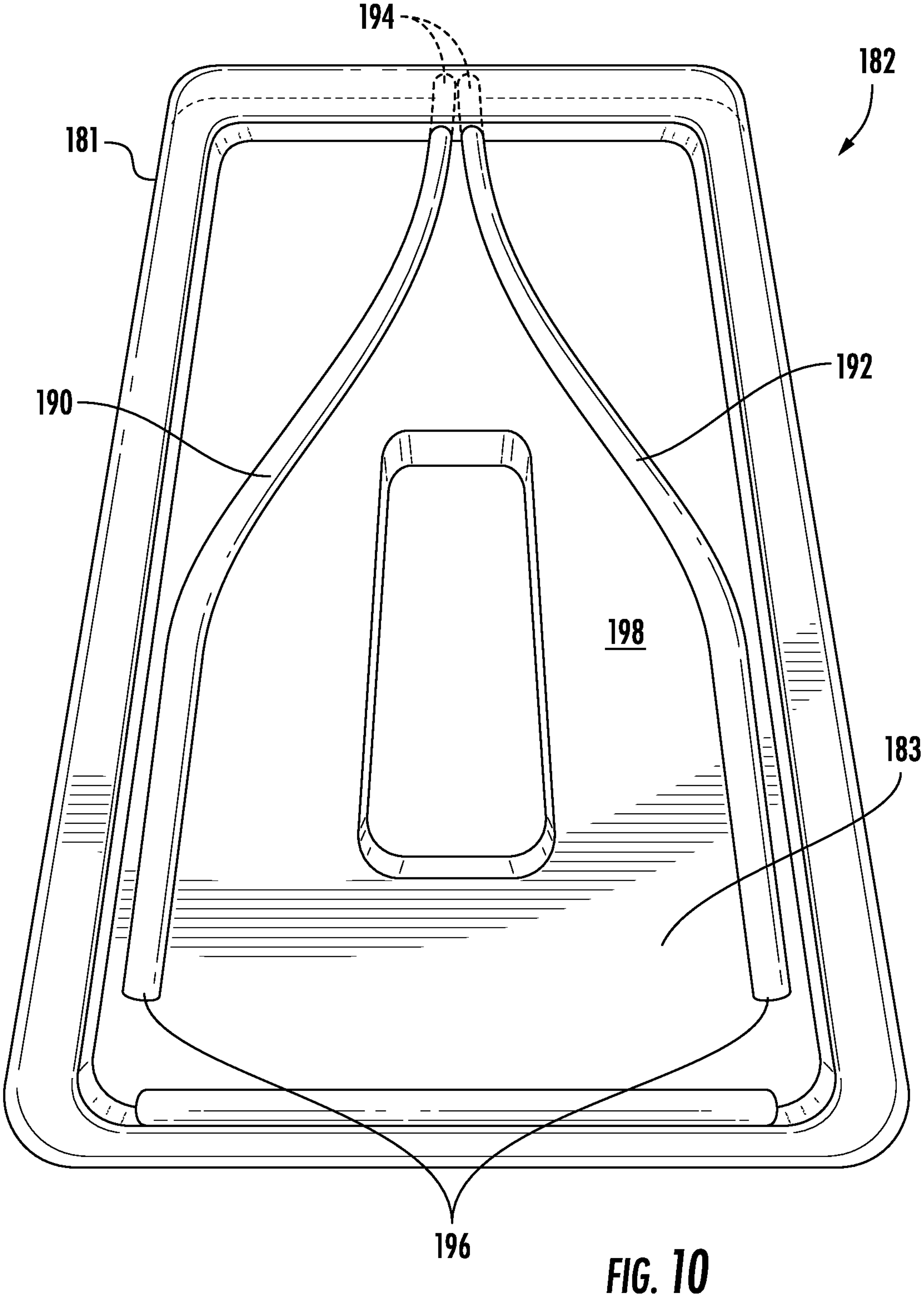
FIG. 10 represents a bottom view of the lid of FIG. 9.

In an alternate embodiment illustrated in FIGS. 9 and 10, autofill pitcher lid 182 comprises a top wall 184 having a bottom surface 183 and a substantially continuous peripheral skirt 181 extending from the bottom surface 183. The lid 182 is received in pitcher opening 151 as described above. Disposed on the skirt 181 is a gasket 186, similar in construction to gasket 162 described above, in that gasket 186 at least has a plurality of sealing surfaces 163. The gasket 186 may be disposed on the skirt 181 adjacent to or abutting bottom surface 183. In the illustrated embodiment, gasket 186 is interrupted in the area of lid 182 that corresponds to spout 152. As discussed above, portions of gasket 186, for example the ends 187, 188, may be anchored to the skirt 181 using known methods. In other alternate embodiments, the gasket 186 is a continuous band disposed on the skirt 181.

As illustrated, lid 182 includes one or more (two shown) passages, tubes 190, 192 formed through a portion of the lid 182. For example, the channels 190, 192 may be formed with first channel ends, vents 194, through the skirt 181, at or below top wall 184 as shown, between the gasket 186 and the top wall 184. The vents 194 are shown as round in cross section for ease of illustration. Other embodiments have vents of other cross-sectional shapes. A first channel end, vent 194 of one of the one or more channels 190, 192 is exposed to the ambient atmosphere 172 in an area corresponding to the spout 152 when the lid 182 is received in the opening 151. The vents 194 pass through the skirt 184 and form channels 190, 192 in or on the lid 182. The channels 190, 192 terminate at second channel end 196 in the interior portion 198 bounded by the skirt 184 and bottom surface 183. When lid 182 is received in the pitcher opening 151, interior portion 198 provides an upper boundary of pitcher volume 148. Accordingly, pitcher volume 148 is in fluid communication with ambient atmosphere 172 via channels 190, 192 and vents 194. As above, when a volume of fluid is dispensed (as in FIG. 8), a corresponding volume of ambient atmosphere is drawn into the pitcher volume 148 through vents 194 and channels 190, 192.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An autofill pitcher assembly defining a height direction, a width direction, and a depth direction, the height, width, and depth directions being mutually perpendicular, the autofill pitcher assembly comprising:

a pitcher comprising a pitcher wall connected to a pitcher bottom defining a pitcher volume, the pitcher wall defining an opening at a top edge of the pitcher; and a lid removably received in the opening of the pitcher, the lid comprising:

a top wall having a bottom surface;

a skirt extending from the bottom surface;

a gasket disposed on the skirt spaced apart from the bottom surface; and a vent defined in the skirt at a location between the bottom surface of the top wall and the gasket, wherein:

the top edge of the pitcher and the bottom surface of the top wall are abutting when the lid is removably received in the opening at the top edge of the pitcher; and the pitcher wall comprises an inner surface, further wherein the inner surface, the skirt, the gasket, and the bottom surface cooperate with the vent to form an air flow channel.

2. The autofill pitcher assembly of claim 1, wherein the air flow channel is in fluid communication with the vent.

3. The autofill pitcher assembly of claim 2, wherein the air flow channel is in fluid communication with the pitcher volume via the vent.

4. The autofill pitcher assembly of claim 1, wherein the air flow channel is in fluid communication with an ambient atmosphere.

5. The autofill pitcher assembly of claim 4, wherein:

the pitcher wall defines a spout at a first end of the pitcher; and an inlet to the air flow channel is provided at the spout.

6. The autofill pitcher assembly of claim 1, wherein the skirt further comprises a lower retaining wall positioned below the vent and an upper retaining wall positioned between the vent and the lower retaining wall.

7. The autofill pitcher assembly of claim 6, wherein the gasket is disposed between the upper retaining wall and the lower retaining wall.

8. The autofill pitcher assembly of claim 1, wherein the gasket comprises multiple sealing surfaces engaged with the inner surface of the pitcher wall when the lid is received in the pitcher.

9. A lid for a pitcher, the lid comprising:

a top wall having a bottom surface;

a skirt extending from the bottom surface; and a gasket disposed on the skirt spaced apart from the bottom surface, wherein:

the skirt defines a vent formed therethrough, the vent located between the bottom surface and the gasket; and the skirt is spaced apart from a perimeter of the lid such that the bottom surface, the skirt, and the gasket in communication with the vent partially define an air flow channel.

10. The lid of claim 9, wherein the air flow channel is in fluid communication with the vent.

11. The lid of claim 9, wherein the skirt comprises a lower retaining wall positioned below the vent and an upper retaining wall positioned between the vent and the lower retaining wall.

12. The lid of claim 11, wherein the gasket is disposed between the upper retaining wall and the lower retaining wall.

13. The lid of claim 9, wherein the gasket is a continuous band.

14. The lid of claim 9, wherein the gasket comprises multiple sealing surfaces.

* * * * *